(12) United States Patent
Van Sloun et al.

(10) Patent No.: US 6,728,072 B1
(45) Date of Patent: Apr. 27, 2004

(54) INTERGRAL BASE PLATE WITH BOSS TOWER

(75) Inventors: Shane J. Van Sloun, Waconia, MN (US); Mark R. Christianson, Darwin, MN (US); Stevenson J. Marek, Hutchinson, MN (US); James R. Mahoney, Stewart, MN (US); Mark A. Schmidt, Darwin, MN (US); Brandon K. Fraser, Hutchinson, MN (US); Jeffry S. Bennin, Hutchinson, MN (US)

(73) Assignee: Hutchinson Technology, Inc., Hutchinson, MN (US)

( * ) Notice: Subject to any disclaimer, the term of this patent is extended or adjusted under 35 U.S.C. 154(b) by 92 days.

(21) Appl. No.: 10/093,222

(22) Filed: Mar. 6, 2002

Related U.S. Application Data

(60) Provisional application No. 60/273,749, filed on Mar. 6, 2001.

(51) Int. Cl.[7] ................................................. G11B 5/48
(52) U.S. Cl. ................................ 360/244.6; 360/244.3; 360/244.5; 360/245.2
(58) Field of Search ........................... 360/244.3, 244.5, 360/244.6, 245.2

(56) References Cited

U.S. PATENT DOCUMENTS

| | | | | |
|---|---|---|---|---|
| 5,285,564 A | | 2/1994 | Imasaki | 29/603.07 |
| 5,793,569 A | | 8/1998 | Christianson et al. | 360/244.3 |
| 5,860,206 A | | 1/1999 | Tochiyama | 29/603.04 |
| 5,875,071 A | | 2/1999 | Erpelding et al. | 360/244.3 |
| 5,877,919 A | | 3/1999 | Foisy et al. | 360/244.6 |
| 5,956,210 A | | 9/1999 | Kaneko | 360/244.6 |
| 5,973,885 A | | 10/1999 | Hanrahan et al. | 360/244.6 |
| 6,195,236 B1 | | 2/2001 | Hiraoka et al. | 360/244.5 |
| 6,269,532 B1 | * | 8/2001 | Toensing | 29/603.02 |
| 6,313,971 B1 | * | 11/2001 | Takagi et al. | 360/245.2 |
| 6,404,593 B1 | * | 6/2002 | Iwamoto | 360/244.6 |
| 6,597,538 B1 | * | 7/2003 | Kashima et al. | 360/244.5 |
| 6,625,871 B1 | * | 9/2003 | Schmidt et al. | 29/603.06 |
| 6,636,382 B2 | * | 10/2003 | Shiraishi | 360/244.3 |
| 6,657,821 B1 | * | 12/2003 | Jenneke | 360/245.2 |
| 2002/0181155 A1 | * | 12/2002 | Takagi et al. | 360/244.3 |
| 2003/0128472 A1 | * | 7/2003 | Takagi et al. | 360/244.6 |

FOREIGN PATENT DOCUMENTS

| | | |
|---|---|---|
| DE | 197 06 906 A1 | 12/1997 |
| EP | 0 851 408 A2 A3 | 7/1998 |
| EP | 0 986 049 A1 | 3/2000 |
| JP | 10-188504 | 7/1998 |

* cited by examiner

*Primary Examiner*—Jefferson Evans
(74) *Attorney, Agent, or Firm*—Faegre & Benson LLP

(57) ABSTRACT

A head suspension assembly in a rigid disk drive having a load beam with a mounting region, a rigid region and a spring region located between the mounting region and rigid region. The mounting region includes an integral boss tower having attachment features. A method of making a multi-piece head suspension for a rigid disk drive is also disclosed. The method includes providing a first layer including a mounting region with an integral boss tower attached to a stiffener by one or more positioning tabs; attaching a second layer including a spring region to an interface between the mounting region and the stiffener; attaching a flexure to the stiffener; and removing the positioning tabs. The flexure can optionally be a portion of the second layer.

26 Claims, 10 Drawing Sheets

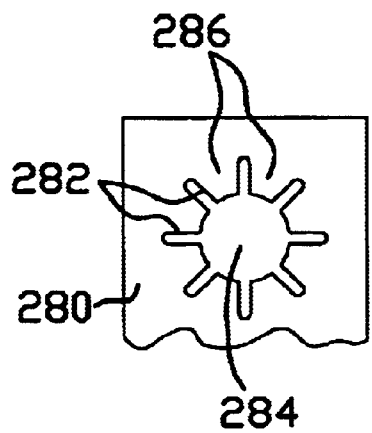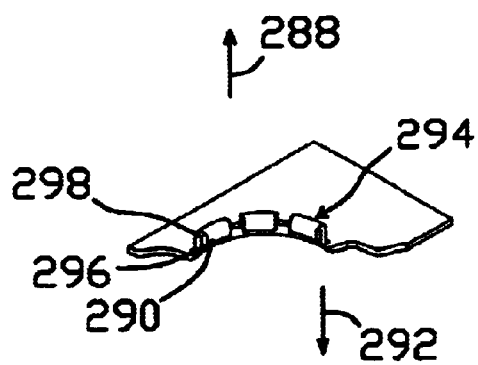
FIG. 5A  FIG. 5B
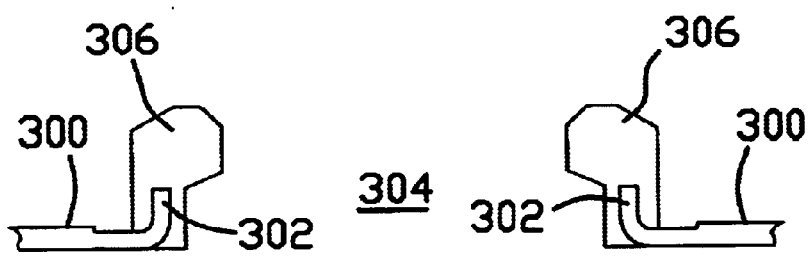
FIG. 6

INTERGRAL BASE PLATE WITH BOSS TOWER

This application claims the benefit of U.S. Provisional Application Serial No. 60/273,749 filed Mar. 6, 2001.

FIELD OF THE INVENTION

The present invention is directed to a head suspension assembly having a mounting region with an integral boss tower and to a multi-piece head suspension assembly with an integral boss tower.

BACKGROUND OF THE INVENTION

In a dynamic rigid disk storage device, a rotating disk is employed to store information. Rigid disk storage devices typically include a frame to provide attachment points and orientation for other components, and a spindle motor mounted to the frame for rotating the disk. A read/write head is formed on a "head slider" for writing and reading data to and from the disk surface. The head slider is supported and properly oriented in relationship to the disk by a head suspension that provides both the force and compliance necessary for proper head slider operation. As the disk in the storage device rotates beneath the head slider and head suspension, the air above the disk also rotates, thus creating an air bearing which acts with an aerodynamic design of the head slider to create a lift force on the head slider. The lift force is counteracted by a spring force of the head suspension, thus positioning the head slider at a desired height and alignment above the disk that is referred to as the "fly height."

Head suspensions for rigid disk drives include a load beam and a flexure. The load beam includes a mounting region at its proximal end for mounting the head suspension to an actuator of the disk drive, a rigid region, and a spring region between the mounting region and the rigid region for providing a spring force to counteract the aerodynamic lift force generated on the head slider during the drive operation as described above. The flexure typically includes a gimbal region having a slider-mounting surface where the head slider is mounted. The gimbal region is resiliently moveable with respect to the remainder of the flexure in response to the aerodynamic forces generated by the air bearing. The gimbal region permits the head slider to move in pitch and roll directions and to follow disk surface fluctuations.

In one type of head suspension, the flexure is formed as a separate piece having a load beam-mounting region that is rigidly mounted to the distal end of the load beam using conventional methods such as spot welds. Head suspensions of this type typically include a load point dimple formed in either the load beam or the gimbal region of the flexure. The load point dimple transfers portions of the load generated by the spring region of the load beam to the flexure, provides clearance between the flexure and the load beam, and serves as a point about which the head slider can gimbal in pitch and roll directions to follow fluctuations in the disk surface.

The actuator arm is coupled to an electromechanical actuator that operates within a negative feedback, closed-loop servo system. The actuator moves the data head radially over the disk surface for track seek operations and holds the transducer directly over a track on the disk surface for track following operations.

The preferred method of attaching the head suspension to the actuator arm is swaging because of the speed and cleanliness of the swaging process. Swaging also provides a strong joint that resists microslip. The swaging process has been in use in rigid disk drives since the late 1960s for attaching head-suspension assemblies to actuator arms.

FIG. 1 is an exploded, isometric view of a conventional head stack assembly 10 including a load beam 12, an actuator arm 32 and a discrete base plate 24 with a boss tower 28. The head suspension assembly 10 includes a load beam 12 with a flexure 16 to which a head slider 20 having a read/write element or head is to be mounted. The load beam 12 includes a mounting region 14 at a proximal end, a rigid region 22 adjacent to a distal end, and a spring region 18 between the mounting region 14 and rigid region 22. Spring region 18 is relatively resilient and provides a downward bias force at the distal tip of load beam 12 for holding the read/write head near a spinning disk in opposition to an upward force created by an air bearing over the disk. The flexure 16 is to allow pitch and roll motion of head slider 20 and read/write head as they move over the data tracks of the disk. The head suspension assembly 10 is typically coupled to the actuator via the actuator arm 32 that is attached to the mounting 14 region of load beam 12.

A swage type attachment is used to couple the mounting region 14 of the load beam 12 to the actuator arm 32. To swage load beam 12 to actuator arm 32, actuator arm 32 and mounting region 14 include apertures 34 and 26, respectively. The base plate 24 having a boss tower 28 with a swage hole 30 extending therethrough and, typically, a square flange 36 is welded or otherwise attached to a bottom face of mounting region 14 of load beam 12. Boss tower 28 is then inserted through actuator arm aperture 34. One or more swage balls are then forced through swage hole 30 in boss tower 28 causing boss tower 28 to expand in actuator arm aperture 34. This expansion creates a frictional attachment interface between outside surface 66 of boss tower 28 and interior surface 68 of actuator arm aperture 34. The load beam 12 typically includes one or more processing holes 38 useful for aligning the load beam 12 with the base plate 24 and/or actuator arm 32. The base plate 24 and/or actuator arm 32 may optionally include corresponding processing holes 38a, 38b to facilitate alignment.

The design of the swage joint has been reduced in size to keep up with the miniaturization of disk drives. As the industry pushes to decrease disk spacing and to increase aerial spacing, the thickness of the base plate 24 and actuator arm 32 are constantly being decreased. However, recent moves to disk-to-disk spacing of under two millimeters have presented a severe problem. Miniaturization of the swage plates is not satisfactory because the torque-out capability that the swaged system drops too low to be useful.

What is needed is an attachment system that reduces head stack thickness without compromising torque-out capabilities.

BRIEF SUMMARY OF THE INVENTION

The present invention is directed to a head suspension assembly with a mounting region comprising an integral boss tower. The integral boss tower can be formed from material comprising the mounting region or as a separate component attached directly to the mounting region without a base plate. The integral boss tower eliminates the base plate and reduces the size of the head stack assembly, and hence, reduces disk spacing. The elimination of the base plate also reduces mass and inertia of the head suspension. The present integral boss tower can be used to mount a head suspension assembly to an actuator arm using industry-accepted standards.

The head suspension assembly comprises a load beam having a mounting region, a rigid region, and a spring region located between the mounting region and rigid region. The mounting region comprises an integral boss tower having an attachment feature. The integral boss tower can be formed from the material comprising the mounting region or attached directly to the mounting region without a base plate.

The mounting region, the rigid region, and the spring region can be a unitary structure. Alternatively, the mounting region and the rigid region can be separate components.

The present invention is also directed to a multi-piece head suspension assembly with an integral boss tower. In one embodiment, the mounting region and the rigid region comprise a first layer, and the spring region comprises a second layer in a multi-piece suspension. In another embodiment, the mounting region and the rigid region comprise a first layer, and the spring region and a flexure comprise a second layer in a multi-piece suspension. In yet another embodiment, the mounting region and the rigid region comprise a first layer, the spring region comprises a second layer, and the flexure comprises a third layer in a multi-piece suspension.

The boss tower can be a separate component attached to mounting features located in the mounting region, such as by welding, adhesive bonding or injection molding the boss tower in place over formed or etched mounting features. The mounting features can be a variety of structures, such as tabs or holes. For example, the mounting features can be a plurality of radial tabs formed adjacent to an aperture in the mounting region comprising at least one bend.

The present invention is also directed to a head stack assembly in a rigid disk drive. The head stack assembly includes an actuator arm and a head suspension assembly comprising a load beam having a mounting region, a rigid region, and a spring region located between the mounting region and rigid region. The mounting region comprises an integral boss tower having an attachment feature.

The present invention is also directed to a method of forming a multi-piece head suspension for a rigid disk drive comprising the steps of providing a first layer including a mounting region with an integral boss tower attached to a stiffener by one or more positioning tabs; attaching a second layer including a spring region to an interface between the mounting region and the stiffener; attaching a flexure to the stiffener; and removing the positioning tabs. The flexure can be a portion of the second layer or a third layer.

The present invention is also directed to a method of forming a multi-piece head suspension for a rigid disk drive having a load beam with a mounting region, a rigid region and a spring region located between the mounting region and rigid region, comprising the steps of creating a plurality of tabs adjacent to an aperture in the mounting region; and making at least one bend in one or more tabs to generate an integral boss tower. The tabs can optionally be created to extend radially inward toward a center of the aperture or a variety of other configurations.

The present invention is also directed to a method of forming a head suspension for a rigid disk drive having a load beam with a mounting region, a rigid region, and a spring region located between the mounting region and rigid region. The method comprises the steps of locating a plurality of mounting features adjacent to an aperture in the mounting region; and attaching a boss tower to the mounting features. In one embodiment, the step of attaching a boss tower to the mounting feature comprises molding the boss tower in place.

BRIEF DESCRIPTION OF THE SEVERAL VIEWS OF THE DRAWING

FIG. 5A is a top view of a mounting region of a load beam in accordance with the present invention.

FIG. 5B is a perspective view of a boss tower integrally formed in the mounting region of FIG. 5A.

FIG. 6 is a side sectional view of a boss tower attached to mounting features and/or a mounting region in accordance with the present invention.

DETAILED DESCRIPTION OF THE INVENTION

Figure 2:
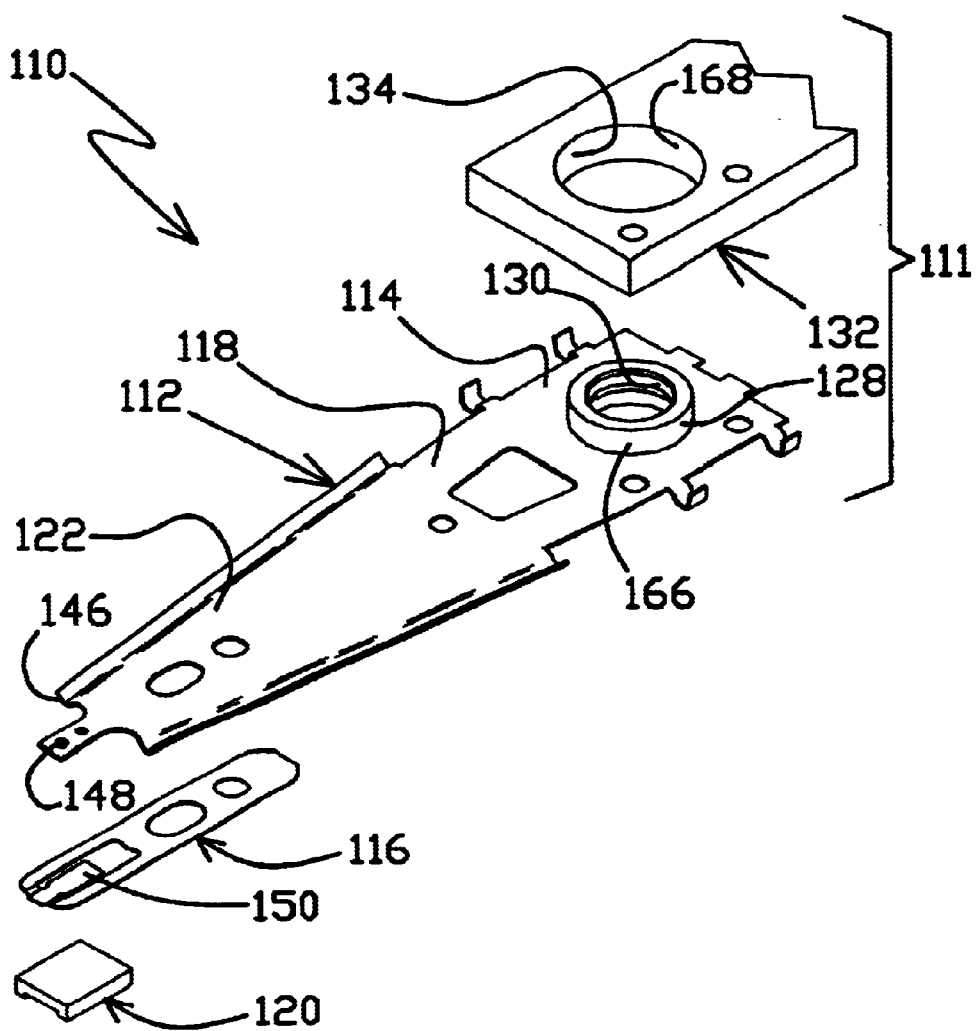
FIG. 2 is a perspective view of a head suspension assembly having a mounting region with an integral boss tower in accordance with the present invention.

FIG. 2 is an exploded, isometric view of a head stack assembly 111 including a head suspension assembly 110 and an actuator arm 132. The head suspension assembly 110 includes a load beam 112 with a flexure 116 to which a head slider 120 having a read/write element or head mounted at a slider mounting surface 150. Slider mounting surface 150 on flexure 116 in combination with dimple 148 on distal end 146 allows pitch and roll motion of head slider 120 and read/write head as they move over the data tracks of the disk.

The load beam 112 includes a mounting region 114 at a proximal end, a rigid region 122 adjacent to a distal end and a spring region 118 between the mounting region 114 and rigid region 122. Spring region 118 is relatively resilient and provides a downward bias force at the distal tip of load beam 112 for holding the read/write head 120 near a spinning disk in opposition to an upward force created by an air bearing over the disk.

The mounting region 114 includes an integral boss tower 128 accordance with the present invention. In the embodiment of FIG. 2, the mounting region 114, the spring region 118, the rigid region 122, and the boss tower 128 are all formed as a unitary structure from the same piece of material or layer. As used herein, "integral boss tower" refers to a boss tower formed from a portion of the discrete piece of material comprising the mounting region; a boss tower attached to the mounting region without a base plate; or a combination thereof.

The integral boss tower can be created from the metal comprising the mounting region 114 using a reduction or a non-reduction stamping or forming operation. In embodiments where the boss tower 128 is a separate component, the boss tower 128 can be attached to the mounting region 114 using adhesives, welding, fasteners, interconnecting features formed on the boss tower 128 and/or the mounting region 114, or combinations thereof Suitable adhesives include pressure sensitive adhesives, thermosetting or thermoplastic adhesives, radiation cured adhesives, adhesives activated by solvents, and combinations thereof. In another embodiment, features formed on the mounting region 114 can serve as the boss tower or can be interengaged with a separately formed boss tower. In another embodiment, the boss tower can be injection molded in place over formed or etched mounting features. As used herein, "mounting feature" refers to aspects or structure in the mounting region that facilitates attachment of a boss tower. The boss tower can be constructed from metals, polymeric materials, metal-polymer composites, ceramic-polymer composites, or a variety of other materials.

The boss tower 128 has one or more attachment features used to couple the integral boss tower 128 on the mounting region 114 of a load beam to an actuator arm 132. As used herein, "attachment feature" refers to one or more aspects or structures of a boss tower that facilitate attachment to an actuator arm. In the illustrated embodiment, the attachment feature is a swage type attachment. To swage load beam 112 to actuator arm 132, the boss tower 128 is inserted into the aperture 134 on the actuator arm. One or more swage balls are then forced through swage hole 130 in boss tower 128 causing boss tower 128 to expand in actuator arm aperture 134. This expansion creates a frictional attachment interface between outside surface 166 of boss tower 128 and interior surface 168 of actuator arm aperture 134.

Figure 1:
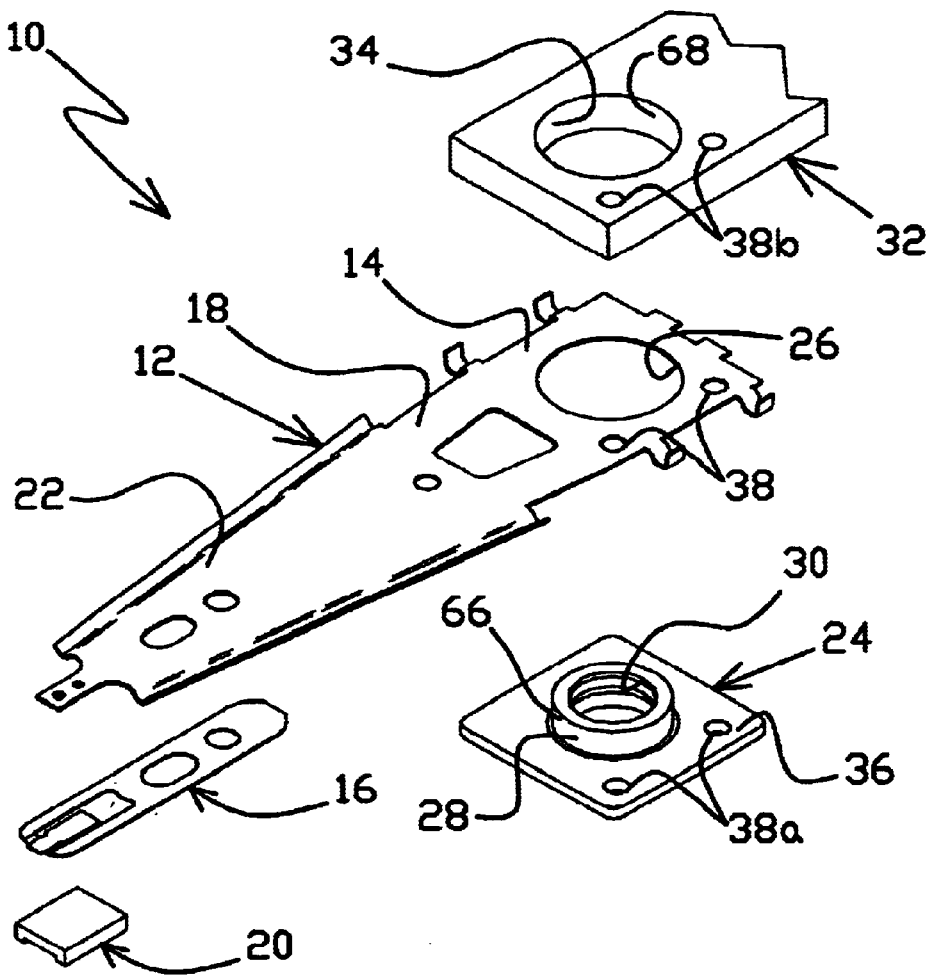
FIG. 1 is a perspective view of a conventional head suspension assembly.

Elimination of the base plate 24 of FIG. 1 significantly reduces the thickness of the head stack assembly 111 in the region adjacent to the actuator arm 132, permitting a reduction in disk spacing. This reduction in thickness can be achieved without reducing the surface area of the outside surface 166 on the boss tower 128. The elimination of the base plate also reduces mass and inertia of the head suspension 110.

Figure 3A:
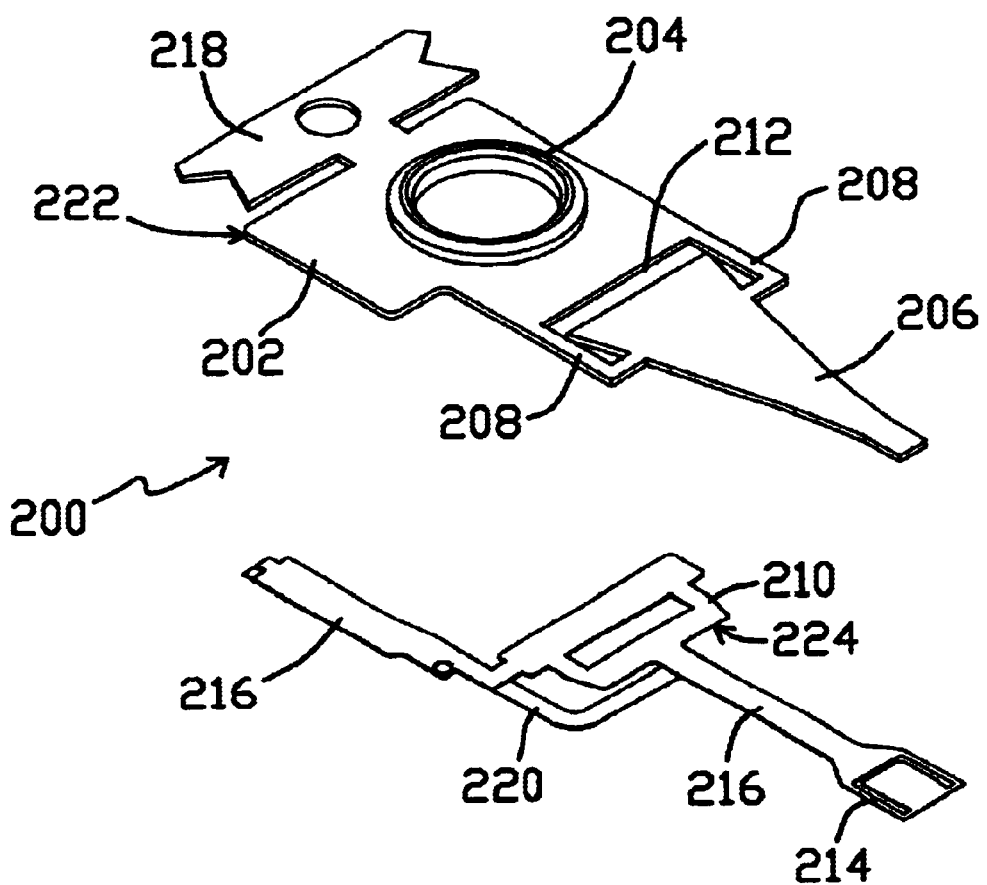
FIG. 3A is an exploded view of components for a multi-layered head suspension assembly with a mounting region having an integral boss tower in accordance with the present invention.
Figure 3B:
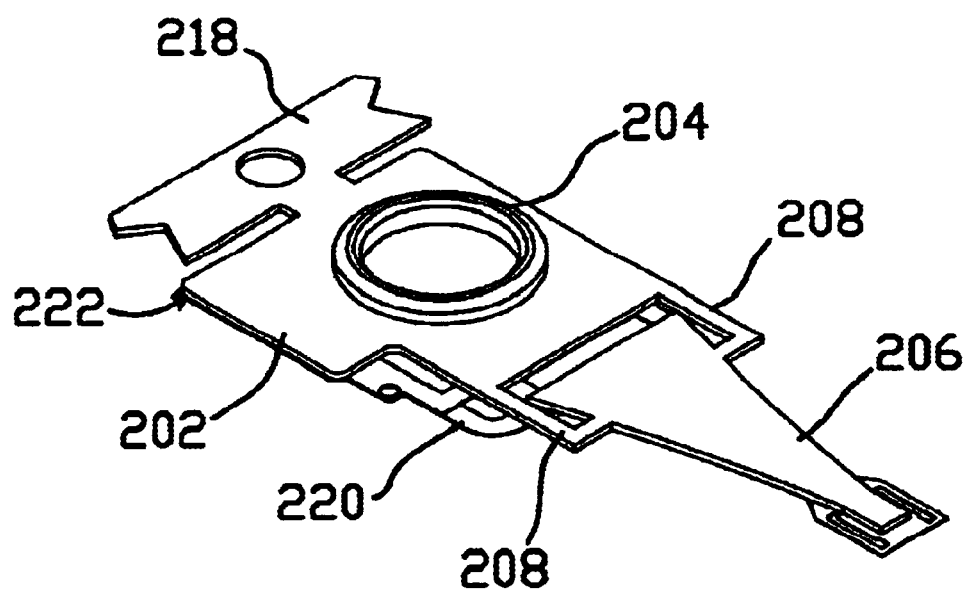
FIG. 3B is a perspective view of a multi-layered head suspension assembly constructed from the components of FIG. 3A.
Figure 3C:
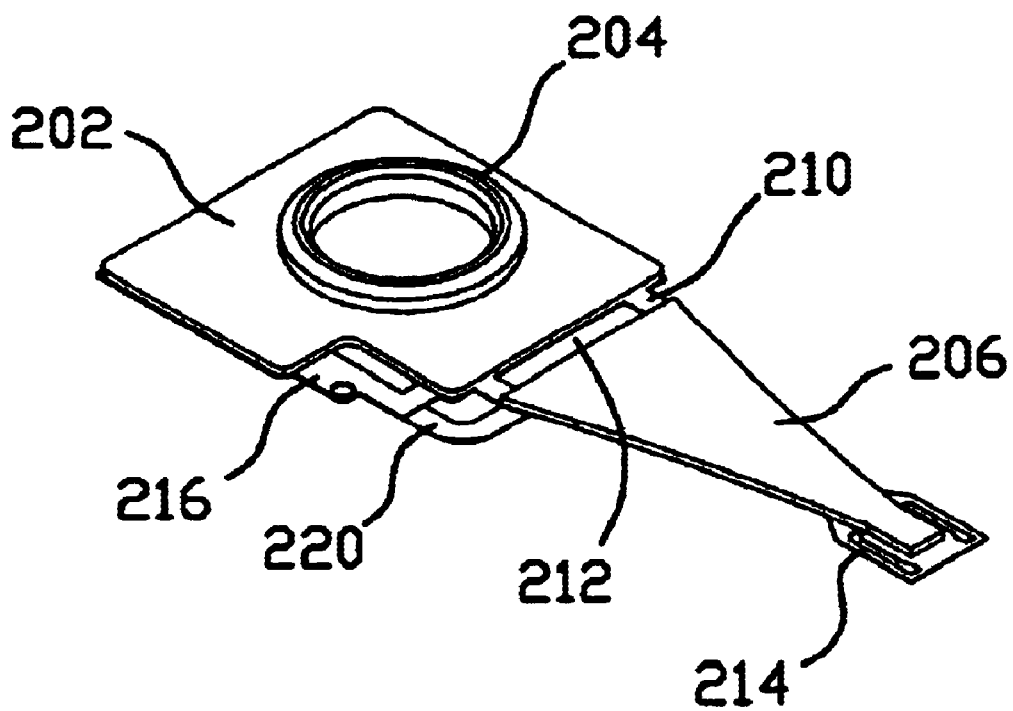
FIG. 3C is a perspective view of a completed head suspension of FIG. 3B.

FIGS. 3A–3C illustrate an alternate multi-piece head suspension assembly 200 in accordance with the present invention. As best illustrated in FIG. 3A, the head suspension assembly 200 includes a mounting region 202 with an integral boss tower 204. The mounting region 202 is releasably attached to stiffener 206 by a pair of positioning tabs 208. The stiffener 206 comprises the rigid region. A carrier strip 218 is optionally attached to the mounting region 202. A typical carrier strip 218 is typically attached to a plurality of mounting regions.

For high resonance performance, the stiffener. 206, the boss tower 204 and the mounting region 202 are preferably made from the same sheet or layer 222 of material. The mounting region 202 and the stiffener 206 remain tabbed together during assembly, which facilitates more accurate placement of the components during assembly of the head suspension 200.

In the illustrated embodiment, spring region 210 is a separate component that is attached so as to extend across gap 212 between the mounting region 202 and the stiffener 206. Flexure 214 and the spring region 210 are made from the same sheet or layer 224 of material. The flexure 214 illustrated in FIG. 3A includes a lead support 216 for supporting electrical leads 220 to the slider (see FIG. 2).

The spring region and flexure layer 224 is stacked with the mounting region and stiffener layer 222. The layers 222, 224 are joined by spot welding, adhesives, or a variety of other techniques. Intermediate layers, such as adhesive layers may be used. As best illustrated in FIG. 3C, the positioning tabs 208 and the carrier strip 218 are then removed so as to free the spring region 210 to operate as intended.

Figure 4A:
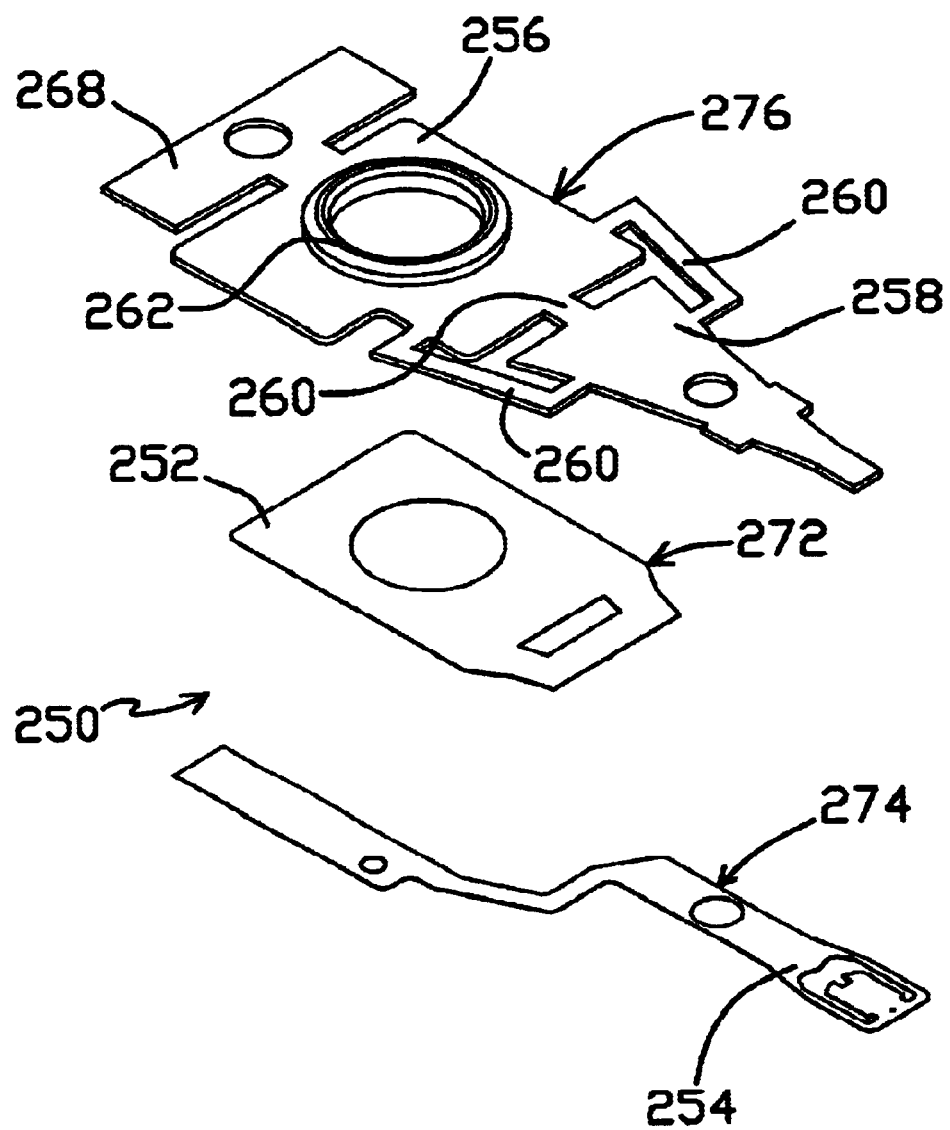
FIG. 4A is an exploded view of components for a multi-layered head suspension assembly with a mounting region having an integral boss tower in accordance with the present invention.
Figure 4B:
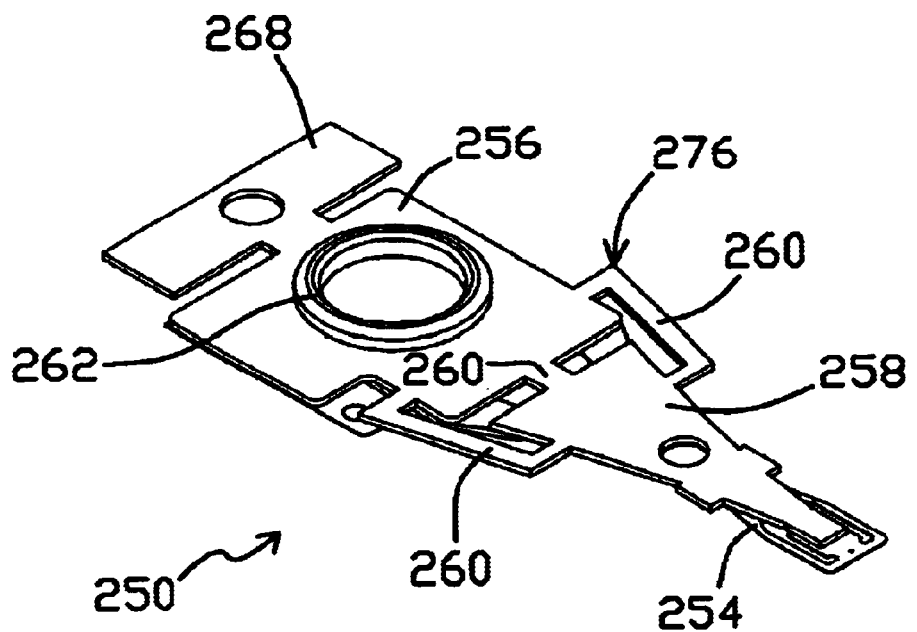
FIG. 4B is a perspective view of a multi-layered head suspension assembly constructed from the components of FIG. 4A.
Figure 4C:
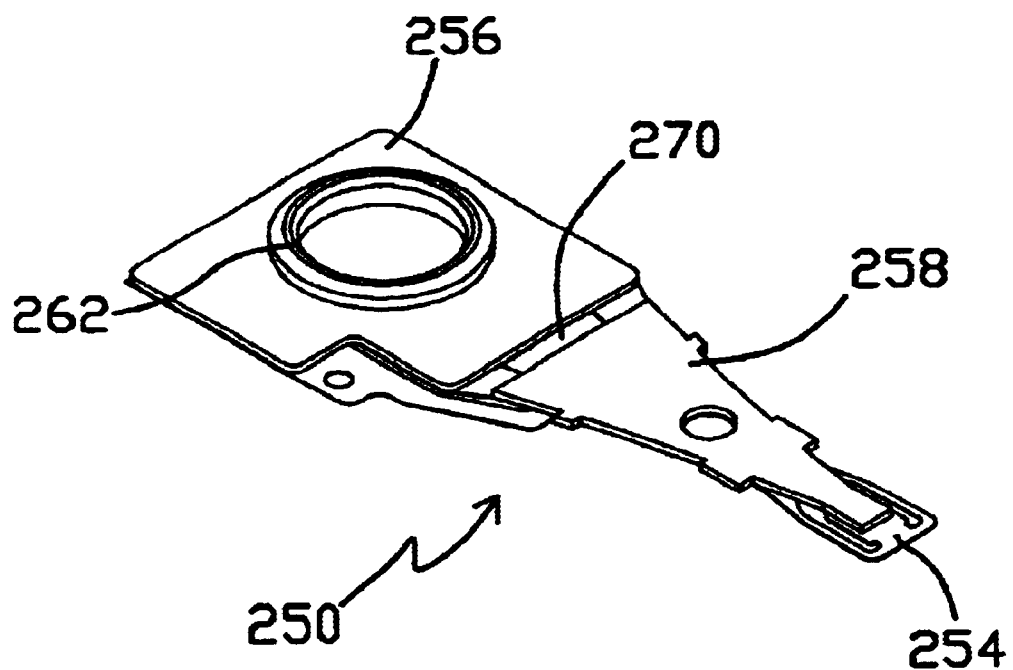
FIG. 4C is a perspective view of a completed head suspension of FIG. 4B.

FIGS. 4A–4C illustrates an alternate multi-piece head suspension assembly 250 in which spring region 252 is a separate component or layer 272 from the layer 274 comprising the flexure 254. Mounting region 256 is attached to stiffener 258 by positioning tabs 260 in layer 276. A carrier strip 268 is also shown. Mounting region 256 includes an integral boss tower 262, as discussed above. The layers 272, 274, 276 are aligned and joined together using any of the variety of the methods discussed above. As best illustrated in FIG. 4C, the positioning tabs 260 and the carrier strip 268 are removed forming gap 270.

FIG. 5A illustrates a mounting region 280 of a head suspension assembly (see FIG. 2) in which a series of slots 282 have been stamped or etched adjacent to aperture 284. The slots 282 preferably extend radially toward the center of the aperture 284, although a variety of curvilinear or angled shapes can be used. The positioning of the slots 282 define a plurality of features or tabs 286. As illustrated in FIG. 5B, tabs 286 formed by the slots 282 have a first bend 296, upwards in a first direction 288 forming a boss tower 294. Distal ends 290 of the tabs 286 optionally have a second bend 298, downward in a direction 292, useful to reinforce the boss tower 294. The tabs 286 comprise the attachment feature for attachment to an actuator arm (see FIG. 2).

In an alternate embodiment, a series of bends can be made in the tabs 286 to attach a discrete boss tower to the mounting region 280. In one embodiment, the tabs 286 are bent so that a discrete boss tower can snap fit or engage with the mounting region 280. In yet another embodiment, a boss tower can be injection molded directly over any of the tab configurations discussed above.

FIG. 6 is side sectional view of a mounting region 300 having mounting features 302 formed adjacent to aperture 304. The mounting features 302 can be etched and/or formed. The mounting features 302 may be continuous or discontinuous around aperture 304. Boss tower 306 can be attached to the mounting features 302 and/or the mounting region 300 using adhesives, welding, fasteners, interconnecting features formed on the boss tower 306 and/or the mounting features 302, or combinations thereof. Suitable adhesives include pressure sensitive adhesives, thermosetting or thermoplastic adhesives, radiation cured adhesives, adhesives activated by solvents, and combinations thereof. In another embodiment, the boss tower 306 is injection molded in place over the mounting features 302. In yet another embodiment, the boss tower 306 is attached to the mounting region 300 and the mounting features 302 serve primarily to position and align the boss tower 306 relative to the aperture 304.

Figure 7:
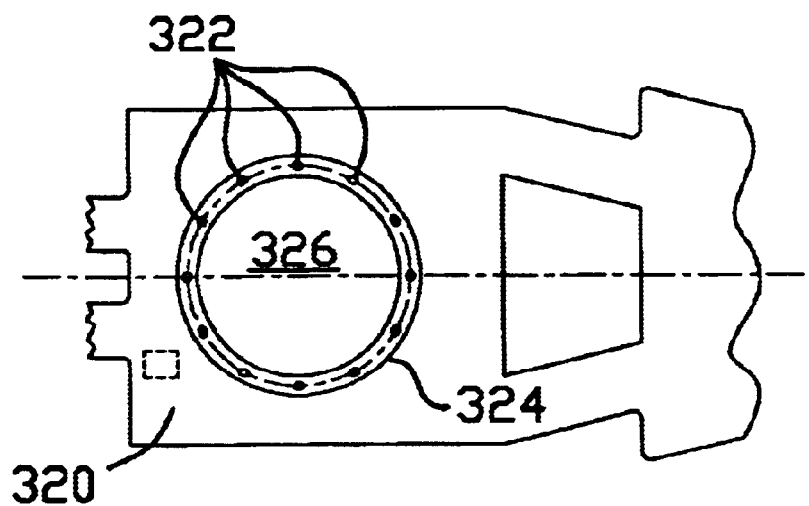
FIG. 7 is a top view of a mounting region with mounting features in accordance with the present invention.

FIG. 7 illustrates an alternate mounting region 320 having a plurality of holes 322 etched or formed around perimeter 324 of aperture 326. The holes 322 facilitate attachment of a boss tower (see FIG. 6) to the mounting region 300. The number, shape, orientation and spacing of the holes 322 can vary. In one embodiment, the holes 322 engage with mounting features on a boss tower in an interlocking or snap-fit configuration. In another embodiment, a boss tower is injection molded to the mounting region 320 and the material from which the boss tower is molded flows through and/or around the holes 322 to strengthen the bond.

Figure 8:
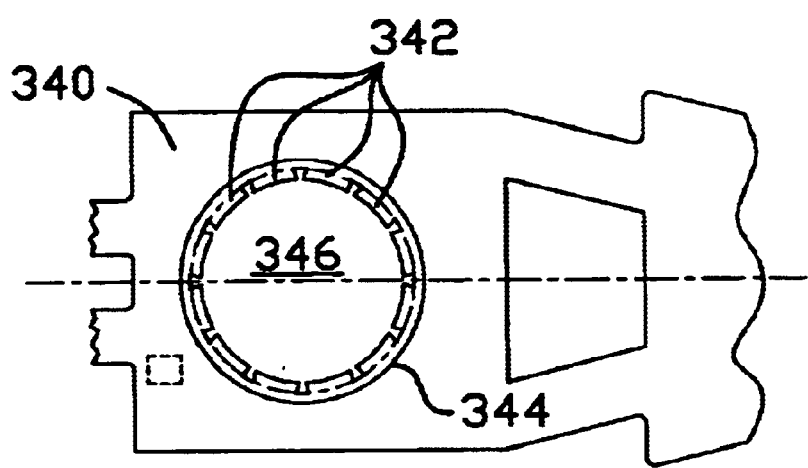
FIG. 8 is a top view of an alternate mounting region with mounting features in accordance with the present invention.

FIG. 8 illustrates another alternate mounting region 340 having a plurality of tabs 342 etched or formed around perimeter 344 of aperture 346. The tabs 342 facilitate attachment of a boss tower (see FIG. 6) to the mounting region 340. The number, shape, orientation and spacing of the tabs 342 can vary. In one embodiment, the tabs 342 engage with mounting features on a boss tower in an interlocking or snap-fit configuration. In another embodiment, a boss tower is injection molded to the mounting region 340 and the material from which the boss tower is molded flows through and/or around the tabs 342 to strengthen the bond.

All patents and patent applications disclosed herein, including those disclosed in the background of the invention, are hereby incorporated by reference. Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A head suspension assembly in a rigid disk drive comprising:
    a load beam including a mounting region, a rigid region, and a spring region located between the mounting region and rigid region; and
    a plurality of tabs, located adjacent to an aperture in the mounting region and positioned at an angle with respect to the mounting region, forming an integral boss tower in the mounting region.

2. The head suspension assembly of claim 1 wherein the tabs and the mounting region comprise different portions of the same piece of material.

3. The head suspension assembly of claim 1 wherein at least one of the tabs comprise at least one bend.

4. The head suspension assembly of claim 1 wherein the tabs comprise a first portion directed away from the mounting region.

5. The head suspension assembly of claim 4 wherein the tabs comprise a second portion directed towards the mounting region.

6. A head suspension assembly in a rigid disk drive comprising:
    a load beam including a mounting region, a rigid region, and a spring region located between the mounting region and rigid region;
    a projecting portion located around a perimeter of an aperture in the mounting region and positioned at an angle with respect to the mounting region; and
    a boss tower attached to the projecting portion.

7. The head suspension assembly of claim 6 wherein the projecting portion and the mounting region comprise different portions of the same piece of material.

8. The head suspension assembly of claim 6 wherein the projecting portion is continuous.

9. The head suspension assembly of claim 6 wherein the projecting portion is discontinuous.

10. A head suspension assembly in a rigid disk drive comprising:
    a load beam including a mounting region, a rigid region, and a spring region located between the mounting region and rigid region;
    a plurality of holes located in the mounting region around a perimeter of an aperture in the mounting region; and
    a boss tower mounted to the mounting region in communication with the holes.

11. The head suspension assembly of claim 10 wherein the boss tower is injection molded to the mounting region to form a bond between the boss tower and the mounting region, and a material from which the boss tower is molded flows through the holes to strengthen the bond.

12. The head suspension assembly of claim 10 wherein the holes engage with the boss tower in an interlocking configuration.

13. The head suspension assembly of claim 10 wherein the holes engage with the boss tower in a snap-fit configuration.

14. A head suspension assembly in a rigid disk drive comprising:
    a load beam including a mounting region, a rigid region, and a spring region located between the mounting region and rigid region;
    a plurality of tabs located around a perimeter of an aperture in the mounting region and positioned at an angle with respect to the mounting region; and
    a boss tower mounted to the mounting region in communication with the tabs.

15. The head suspension assembly of claim 14 wherein the boss tower is injection molded to the mounting region to form a bond between the boss tower and the mounting region, and a material from which the boss tower is molded flows around the tabs to strengthen the bond.

16. The head suspension assembly of claim 14 wherein the tabs engage with the boss tower in an interlocking configuration.

17. The head suspension assembly of claim 14 wherein the tabs engage with the boss tower in a snap-fit configuration.

18. The head suspension assembly according to claim 1, 6, 10, or 14 wherein the mounting region, the rigid region, and the spring region comprise a unitary structure.

19. The head suspension assembly according to claim 1, 6, 10, or 14 wherein the mounting region and the rigid region comprise separate components.

20. The head suspension assembly according to claim 1, 6, 10, or 14 wherein the mounting region and the rigid region comprise a first layer, and the spring region comprises a second layer in a multi-piece suspension.

21. The head suspension assembly according to claim 1, 6, 10, or 14 wherein the mounting region and the rigid region comprise a first layer, and the spring region and a flexure comprise a second layer in a multi-piece suspension.

22. The head suspension assembly according to claim 1, 6, 10, or 14 wherein the mounting region and the rigid region comprise a first layer, the spring region comprises a second layer, and the flexure comprises a third layer in a multi-piece suspension.

23. A head stack assembly in a rigid disk drive comprising:
    an actuator arm including an aperture therein;
    a head suspension assembly in a rigid disk drive including:
        a load beam including a mounting region, a rigid region, and a spring region located between the mounting region and rigid region; and
        a plurality of tabs, located adjacent to an aperture in the mounting region and positioned at an angle with respect to the mounting region, forming an integral boss tower in the mounting region; and
    the integral boss tower inserted into the aperture of the actuator arm.

24. A head stack assembly in a rigid disk drive comprising:

an actuator arm including an aperture therein;

a head suspension assembly in a rigid disk drive including:
- a load beam including a mounting region, a rigid region, and a spring region located between the mounting region and rigid region;
- a projecting portion located around a perimeter of an aperture in the mounting region and positioned at an angle with respect to the mounting region; and
- a boss tower attached to the projecting portion; and the boss tower inserted into the aperture of the actuator arm.

25. A head stack assembly in a rigid disk drive comprising:

an actuator arm including an aperture therein;

a head suspension assembly in a rigid disk drive including:
- a load beam including a mounting region, a rigid region, and a spring region located between the mounting region and rigid region;
- a plurality of holes located in the mounting region around a perimeter of an aperture in the mounting region; and
- a boss tower mounted to the mounting region in communication with the holes; and the boss tower inserted into the aperture of the actuator arm.

26. A head stack assembly in a rigid disk drive comprising:

an actuator arm including an aperture therein;

a head suspension assembly in a rigid disk drive comprising:
- a load beam including a mounting region, a rigid region, and a spring region located between the mounting region and rigid region;
- a plurality of tabs located around a perimeter of an aperture in the mounting region and positioned at an angle with respect to the mounting region; and
- a boss tower mounted to the mounting region in communication with the tabs; and the boss tower inserted into the aperture of the actuator arm.

\* \* \* \* \*

UNITED STATES PATENT AND TRADEMARK OFFICE
CERTIFICATE OF CORRECTION

PATENT NO. : 6,728,072 B1
DATED : April 27, 2004
INVENTOR(S) : Shane J. Van Sloun et al.

It is certified that error appears in the above-identified patent and that said Letters Patent is hereby corrected as shown below:

<u>Title page, Item [54] and Column 1, line 1,</u>
Title, delete the word "INTERGRAL" and replace it with -- INTEGRAL --

Signed and Sealed this

Twenty-seventh Day of July, 2004

JON W. DUDAS
*Acting Director of the United States Patent and Trademark Office*